(12) United States Patent  
Maier et al.

(10) Patent No.: US 9,317,697 B2  
(45) Date of Patent: Apr. 19, 2016

(54) PROCESSING OF RESTRICTED ACCESS DATA

(71) Applicant: International Business Machines Corporation, Armonk, NY (US)

(72) Inventors: Albert Maier, Tuebingen (DE); Thomas Rech, Rittersheim (DE); Johannes Schuetzner, Boeblingen (DE); Volker Seemann, Potsdam (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 247 days.

(21) Appl. No.: 13/750,547

(22) Filed: Jan. 25, 2013

(65) Prior Publication Data

US 2013/0198857 A1     Aug. 1, 2013

(30) Foreign Application Priority Data

Feb. 1, 2012    (EP) ..................................... 12153410

(51) Int. Cl.
*G06F 21/00*      (2013.01)
*G06F 21/60*      (2013.01)
(Continued)

(52) U.S. Cl.
CPC .......... *G06F 21/60* (2013.01); *G06F 17/30286* (2013.01); *G06F 17/30566* (2013.01); *G06F 21/62* (2013.01); *G06F 21/6209* (2013.01)

(58) Field of Classification Search
CPC ..... G06F 21/60; G06F 21/62; G06F 21/6209; G06F 17/30286; G06F 17/30566
USPC .......................... 726/26, 27, 28; 713/164, 167
See application file for complete search history.

(56) References Cited

U.S. PATENT DOCUMENTS 7,113,939 B2 *   9/2006   Chou et al.
7,512,985 B1 *   3/2009   Grabarnik et al. .............. 726/26

(Continued)

FOREIGN PATENT DOCUMENTS

GB        2430591 A     3/2007
WO    WO2013113607 A1    8/2013

OTHER PUBLICATIONS

Bhatti, et al, "Federated Access Control in Distributed Data Warehousing Applications", IP.Com, IPCOM000176162D, Nov. 6, 2008, 13 pages.

(Continued)

*Primary Examiner* — Sarah Su
(74) *Attorney, Agent, or Firm* — Cantor Colburn LLP

(57) ABSTRACT

Embodiments related to processing of restricted-access data. An aspect includes receiving a request for data from a user by a storage system infrastructure comprising a centralized database that stores non-restricted access data and a local system that stores restricted-access data associated with a first set of areas or entities and comprising a federated database for providing a federated view, wherein the requested data comprises restricted-access first data and non-restricted access second data. Another aspect includes based on an association of the user, routing, by a routing entity, the request to the local system. Another aspect includes receiving the request at the at least one federated database of the local system. Another aspect includes retrieving from the federated database the restricted-access first data and the non-restricted access second data. Another aspect includes displaying the federated view comprising the restricted-access first data and the non-restricted access second data to the user.

20 Claims, 4 Drawing Sheets

(51) Int. Cl.
*G06F 17/30* (2006.01)
*G06F 21/62* (2013.01)

(56) References Cited

U.S. PATENT DOCUMENTS

| | | | |
|---|---|---|---|
| 7,702,636 B1* | 4/2010 | Sholtis et al. | 707/999.1 |
| 8,127,133 B2 | 2/2012 | Cross et al. | |
| 2005/0065921 A1* | 3/2005 | Hrle et al. | 707/3 |
| 2006/0050870 A1 | 3/2006 | Kimmel et al. | |
| 2006/0136479 A1 | 6/2006 | Fan et al. | |
| 2006/0136990 A1* | 6/2006 | Hinton | H04L 63/0815 726/2 |
| 2007/0299881 A1 | 12/2007 | Bouganim | |
| 2008/0016372 A1 | 1/2008 | Staddon et al. | |
| 2008/0140620 A1 | 6/2008 | Bender | |
| 2009/0177697 A1* | 7/2009 | Gao | G06F 17/30545 |
| 2009/0199273 A1 | 8/2009 | Yalamanchi | |
| 2010/0281530 A1* | 11/2010 | Tarkoma | 726/9 |
| 2011/0191862 A1* | 8/2011 | Mandava et al. | 726/28 |
| 2011/0214165 A1* | 9/2011 | Jeffreys et al. | 726/5 |
| 2011/0252005 A1* | 10/2011 | Lauer | G06F 17/30545 707/690 |
| 2011/0313981 A1* | 12/2011 | Ben-Natan | 707/694 |
| 2012/0290592 A1* | 11/2012 | Ishii | 707/754 |

OTHER PUBLICATIONS

Kastner, et al., "Access Controls for Federated Database Environments—Taxonomy of Design Choices", International Federation for Information Processing, Technical Committees, 1995, 18 pages.
International Application No. PCT/EP2013/051310; International Search Report and Written Opinion dated Apr. 15, 2013; 12 pages.
"IBM Websphere, Administration Guide for Federated Systems, Version 9", Jan. 1, 2006; retrieved from the Internet: url: ftp://ftp.software.ibm.com/ps/products/db2/info/vr9/pdf/letter/en_US/iiyfpe90.pd; pp. 1-362.
International Application No. PCT/EP2013/051310; International Preliminary Report on Patentability and Written Opinion dated Aug. 14, 2014; pp. 1-10.
International Application No. GB1403742.8, Filed Mar. 4, 2014; International Search Report dated Aug. 19, 2014; pp. 1-3.

* cited by examiner

PROCESSING OF RESTRICTED ACCESS DATA

CROSS-REFERENCE TO RELATED APPLICATION

This application claims the benefit of priority under 35 U.S.C. §119 to European Patent Application No. 12153410.1, filed on Feb. 1, 2012, which is herein incorporated by reference in its entirety.

BACKGROUND

This disclosure relates generally to the field of distributed computing, and more particularly to processing of data in a global software application in which the data being processed is distributed stored in multiple local component databases.

Many countries have data privacy laws forbidding processing and to persistent storage of certain kinds of data outside the particular country. For example, German law only allows transferring of a customer's contact data outside of the European Union/European Economic Area (EU/EEA) region if the customer has explicitly consented to the transfer. This may be a major hurdle for the implementation of a Globally Integrated Enterprise (GIE) strategy, characterized by an integration of regional business processes into global processes, which may be implemented based on globally distributed data being processed without restrictions.

SUMMARY

Embodiments include methods, systems, and computer program products for processing of restricted-access data. An aspect includes receiving a request for data from a user of an instance of a software application by a storage system infrastructure comprising a centralized database that stores non-restricted access data and at least one local system that stores restricted-access data, the at least one local system being associated with a respective first set of areas or entities and comprising at least one federated database for providing a federated view of the non-restricted access data and the restricted access data, wherein the requested data comprises restricted-access first data and non-restricted access second data. Another aspect includes based on an association of the user, routing, by a routing entity, the request to the at least one local system. Another aspect includes receiving the request at the at least one federated database of the at least one local system. Another aspect includes retrieving from the at least one federated database the restricted-access first data and the non-restricted access second data. Another aspect includes displaying the federated view comprising the restricted-access first data and the non-restricted access second data to the user via the software application.

BRIEF DESCRIPTION OF THE SEVERAL VIEWS OF THE DRAWINGS

Referring now to the drawings wherein like elements are numbered alike in the several FIGURES.

DETAILED DESCRIPTION

Figure 1:
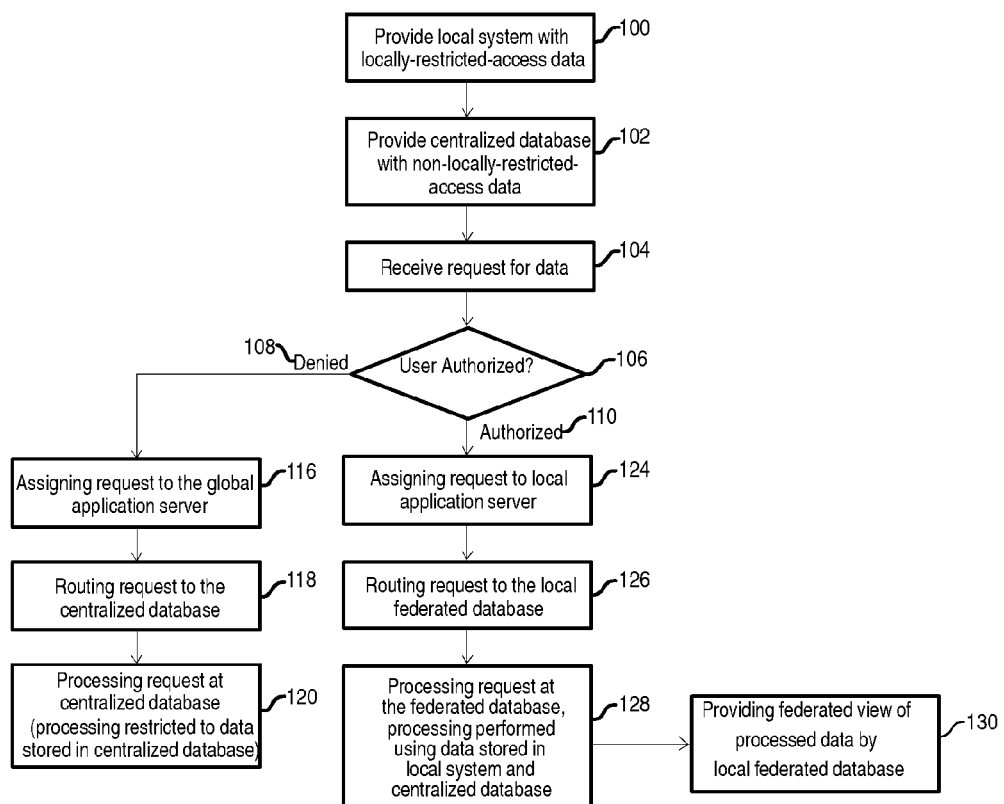
FIG. 1 is a flowchart of a method for providing restricted-access data of distributed data in a federated view.

Embodiments of processing of restricted access data are provided, with exemplary embodiments being discussed below in detail. Embodiments of processing of restricted-access data in a distributed data system provide data sets of the restricted-access data to a user of the distributed data system via an instance of a software application that is associated with the distributed data system. A back-end system infrastructure comprising a centralized database may be provided to persistently storing non-restricted access data in the distributed data system, and at least one local system may also be provided for persistently storing restricted-access data in the distributed data system. Each local system is associated with a respective first set of areas and/or entities, and may comprise at least one federated database for providing a federated view of the non-restricted access data and the restricted access data.

A routing entity may be provided to route a request for a data set of the distributed data from the user via the instance of the software application to the at least one local system or to the centralized database. The routing is based on a matching between the first and the second set of areas and/or the first and the second set of entities, wherein the user and/or the instance of the software application is associated with a second set of areas and/or entities. The requested data set may include non-restricted access first data and restricted access second data. In case of a routing to the at least one local system, the request is received at the federated database, and the first data is retrieved at the federated database from the centralized database where the first data is stored as non-restricted access data. The second data is retrieved at the federated database from the at least one local system where the second part is stored as restricted-access data. Restricted-access data, or privacy protected data, may thereby be integrated in distributed computing system using the local system. The data handling may be compliant with local specific data privacy laws, as restricted access data remains persistently stored in local systems. Users are prevented from storing the restricted access data in a centralized database, which may violate data privacy laws. Any restricted-access data to which access is restricted based on location may be stored using such a local system in a federated database. The at least one local system may additionally comprise at least one local component database, and the restricted-access data may be persistently stored in the at least one federated database and/or the at least one local component database.

The front end of the global software application may display the federated view of the restricted-access data and the non-restricted-access data in one common federated view. There may be therefore no impact for the individual user at the software application level, in particular at the presentation layer. Thus, the individual user does not need any new training. A software provider or system integrator who wants to offer a solution that supports locally-restricted access data may implement a local system for restricted-access data in a relatively cost effective way by adapting an existing solution at the database layer without the need to modify any computer software code in the presentation layer.

By ensuring that restricted-access data is prevented from being stored in a centralized database, double storage of data is prevented, thus increasing the degree of consolidation of data in the distributed data system. Total cost of ownership of the distributed data system may be reduced, and generation of new user IDs is not necessary. The user may view data from multiple databases in the distributed data system without creation of a new user ID for each of the databases. Furthermore, no additional application programming interfaces (APIs) may need to be implemented. Time to value may also be reduced. A user authorization scheme which is applied at an object level at the individual databases is not needed; rather, data storage at an object level may be performed irrespective of any location based user assignments. Thus, modification of a data storage scheme at the object level and modification of software at a business application level may also be avoided.

As discussed herein, restricted-access data may comprise data which, according to country-specific data privacy laws, is only accessible if there is official permission by the country-specific government, or if the owner of the restricted access data has given explicit permission for the restricted-access data to be disclosed to a particular group of members of another country, another legal entity, or another organization. For example, restricted-access data may be privacy protected data, such as an email address, date of birth or a local address. Restricted-access data may also include certain sensitive data that, e.g., an organization or a company does not wish to be processed outside the particular organization or geographical region. Any restricted-access data may be handled by the local system of the distributed data system.

As discussed herein, distributed data is data which may be persistently stored in multiple local systems of a distributed data system, each localized at different locations such as different countries, different legal entities or different organizations. Each local system may comprise at least one federated database and optionally one or more local component databases. The multiple local systems are independent from each other. A federated database system is a type of meta-database management system (DBMS) comprising at least one federated database and which may transparently integrate multiple local component databases into the federated database. The local component databases may be interconnected via a computer network and may be geographically decentralized. Since the local component systems remain autonomous, a federated database system may be used as an alternative to merging together several disparate databases. A federated database may thus be a fully integrated, logical composite of all constituent local component databases in a federated database system.

In accordance with an embodiment, in case of a routing to a centralized database, only the non-restricted access first data is retrieved from the centralized database. This ensures that the restricted-access second data remain at the respective local system. In case of the routing to the centralized database, in accordance with an embodiment a view of only this first data may be provided to the user at the centralized database. Thus, privacy protection based on a geographical location is ensured. When the request for data is directed to the centralized database, the user will not be able to access the restricted access data from the local system. In accordance with an embodiment, in case of the routing to the at least one local system, the method further comprises providing at the federated database the federated view of the non-restricted access first data and restricted-access second data to the user and/or instance. In this case, the user may be provided with both the requested non-restricted access first data and the requested restricted access second data.

In accordance with an embodiment, the first data comprises first objects with first attributes and the second data comprises second objects with second attributes, wherein the first objects correspond to first primary keys of first tables stored persistently in the centralized database and the second objects correspond to second primary keys of second tables stored persistently in the local system. The first tables comprise a first column with the first primary keys and first successive columns with the first attributes associated with the first objects, and the second tables comprise a second column with the second primary keys and second successive columns with the second attributes associated with the second objects. The first attributes are marked by indicators, the indicators indicating if the first attributes are accessible to the user. The generation of the federated view may be performed by generating a third column of third primary keys and third successive columns with third attributes associated with the third primary keys in third tables in the federated database, determining for a given first attribute of the first attributes if the indicator of said given first attribute indicates that this given first attribute is accessible to the local system, and, in case of the given first attribute being accessible to the local system, generating the third primary keys by performing a union process of the first primary keys and the second primary keys and generating the third attributes by a union process of the first and second attributes.

The indicator in the global table of a centralized database indicates whether to get the data for each object from a local system to be able to generate the federated view. Such an indicator may be a Yes/No (Y/N) flag associated with an attribute of an object in some embodiments. For example, an indicator of Y associated to attributes of objects in a global table of the centralized database system may cause the local system to retrieve the information that those attributes are available and in this way accessible in the local table of the local database component. An indicator of N associated to attributes of objects in a global table of the centralized database system may cause the local system gets the information that those attributes are not available and in this way non-accessible in the local table of the centralized database. The Y/N setting of the indicators may be set, e.g., in compliance with country-specific data privacy laws. As discussed herein an object may comprise, fore example, a business object like a customer-ID to which attributes including data such as a name, an address, an e-mail address, etc. are associated.

User authorization may include a definition which particular users are allowed to see particular restricted access data by using external authorization information, such as checking a user's authorization via an administrative table that contains authorization assignments. The user authorization definitions may be made at the application level. By marking an attribute level by means of an indicator, if access to single attributes of an object is allowed or denied, a high degree of differentiation concerning accessibility of the restricted-access data that is stored persistently on a local autonomous component database, is achieved. Although the federated view is generated by a highly differentiated retrieval according to predefined access rights, the generated federated view may have a homogeneous and integrated appearance for the user in a respective instance of the software application.

In accordance with an embodiment, the federated database and the centralized database may be any appropriate type of database, such as relational and/or object-oriented databases. A combination of different kinds of databases may be used in some embodiments; data from a relational database as well as data from an object-oriented database may be combined as data pools for generating a homogeneous and integrative federated view. For the user there may be no difference in the visualization of the federated view.

In accordance with an embodiment, the user and/or instance of the software application may be associated with the second set of areas and/or second entities by an authorization scheme. For example, the authorization scheme may be employed at a tier of the software application to determine a presence of an authorization for the user to access the at least one local system, and if the authorization is present, the request is routed to the local system. This provides an access control mechanism based on a pre-defined authorization. This authorization scheme may be applicable to the user as well as to the respective local instance of the software application. Only in case the user and the instance of the software application are allowed to access locally restricted-access data, the data request that is initiated by the user in the respective instance of the software application may be routed to the respective local system in accordance with a preconfigured location based relationship between the user and the at least one local system.

According to some embodiments, the request may comprise information about a current location of the user, wherein the routing is only performed to at least one local system that matches the location with a first set of areas. A dynamic check of the current location of the user may be performed by the routing entity. For example, in case the user is employing a mobile phone application in order to send the request (i.e. a mobile phone application provides the instance of the software application), it may be ensured that access to the access-restricted data of a given local system is only granted in case of a respective location matching. If the user has moved to a different location not matching the areas assigned to this local system, the access will be automatically denied.

Embodiments of the invention may be applicable to diverse types of infrastructure architecture. According to some embodiments, the system infrastructure may comprise a three-tier architecture, the three-tier architecture comprising: a presentation tier, the instance of the software application being part of the presentation tier, wherein the presentation tier is adapted to visualize the federated view; a middle tier, the middle tier comprising at least at least one local application server dedicated to the at least one local system, at least one global application server dedicated to the centralised database and an application server assignment manager, wherein the application server assignment manager is the routing entity, a data tier, the data tier comprising the centralized database and the at least one federated database. Within the context of this three-tier architecture, a preconfigured relationship between the user and the at least one local application server means that at the level of the application server there may already exist a predefined configuration how the request of a special user, preferentially a special user group, will be routed to the respective local systems. According to other embodiments, the system infrastructure may comprise a two-tier architecture, the two-tier architecture comprising: a presentation tier, the instance of the software application being part of the presentation tier, wherein the presentation tier is adapted to visualize the federated view, wherein the instance of the software application is the routing entity, and a data tier, the data tier comprising the centralized database and the at least one federated database.

In a further aspect, the invention relates to a system for processing restricted-access data of distributed data for providing data sets of the distributed data to a user of an instance of a software application, wherein a back-end system infrastructure for the software application comprises a centralized database persistently storing non-restricted access data of the distributed data, wherein the system comprises at least one local system for persistently storing the restricted-access data of the distributed data. The at least one local system is located in the back-end system infrastructure, each local system is associated with a respective first set of areas and/or entities, and comprises at least one federated database adapted for providing a federated view of the non-restricted access data and the restricted access data. A routing entity is adapted for routing a request for a data set of the distributed data from the user and/or the instance of the software application to the at least one local system or to the centralized database, wherein the routing is based on a matching between the first and the second set of areas and/or the first and the second set of entities, the user and/or instance being associated with a second set of areas and/or entities, wherein the requested data set is constituted from a first and a second part of data. The federated database is operable for receiving the request in case of a routing to the at least one local system, retrieving the first part of the data set from the centralised database where the first part is stored as the non-restricted-access data of the distributed data, and retrieving at the federated database a second part of the data set from the at least one local system where the second part is stored as the restricted-access data of the distributed data, the centralized database is operable for retrieving only the first part of the data in case of a routing to the centralized database.

In another aspect, a computer-implemented method is provided for processing restricted-access data of distributed data for providing data sets of the distributed data to a user of an instance of a software application, a back-end system infrastructure for the software application comprising at least one federated database persistently storing non-restricted access data of the distributed data and at least one local system comprising at least one local component database for persistently storing restricted-access data of the distributed data, each local system being associated with a respective first set of areas and/or entities, wherein the federated database is further adapted for providing a federated view of the non-restricted access data and the restricted access data. A request for a data set of the distributed data is routed from the user and/or the instance of the software application to the at least one federated database, wherein the requested data set is constituted from a first and a second part of data. The request is received at the federated database, retrieving at the federated database the first part of the data set stored in the federated database as the non-restricted-access data of the distributed data. Based on a match between the first and the second set of areas and/or the first and the second set of entities, a second part of the data set is retrieved at the federated database via a secure network from the at least one local system where the second part is stored as the restricted-access data of the distributed data.

Generation of a federated view of data may be performed on a centralized database, in this way increasing the degree of centralization of the system infrastructure by letting restricted-access data being persistently stored in local systems. So, for example, depending on the respective country-specific laws, a violation of country-specific data privacy laws may be prevented. The centralization of the generation of the federated view is made feasible by transferring restricted-access data from remote tables in local systems via a secure network to a centralized federated view in a centralized database. The degree of complexity of the system infrastructure may be reduced, because it is sufficient to have only one federated system as a global database management system. All applications of the overall software system will communicate with this centralized federated system.

In a further aspect, the invention relates to a system for processing restricted-access data of distributed data for providing data sets of the distributed data to a user of an instance of a software application, wherein the system comprises at least one federated database being part of a back-end system infrastructure for the software application, wherein the at least one federated database is adapted for persistently storing non-restricted access data of the distributed data and for providing a federated view of the non-restricted access data and restricted access data, wherein the back-end system infrastructure further comprises at least one local system comprising at least one local component database for persistently storing the restricted-access data of the distributed data, each local system being associated with a respective first set of areas and/or entities. The software application is adapted for routing a request for a data set of the distributed data from the user and/or the instance of the software application to the at least one federated database, wherein the requested data set is constituted from a first and a second part of data. The federated database is operable for receiving the request, retrieving at the federated database the first part of the data set stored in the federated database as the non-restricted-access data of the distributed data. The federated database is further operable for retrieving at the federated database via a secure network a second part of the data set from the at least one local system where the second part is stored as the restricted-access data of the distributed data, wherein the retrieving is based on a matching between the first and the second set of areas and/or the first and the second set of entities.

Various embodiments may be embodied as a method, system, and/or computer program product. Various aspects may take the form of an entirely hardware embodiment, an entirely software embodiment (including firmware, resident software, microcode, etc) or an embodiment combining software and hardware aspects that may or generally be referred to herein as a 'module' or 'system'. Any combination of one or more computer-readable medium(s) may be utilized.

FIG. 1 is a flowchart illustrating an embodiment of method for providing restricted-access data of distributed data in a federated view. A local system comprising a database with locally-restricted access data is provided in block 100. For example, the locally restricted data may be persistently stored in at least one local federated database or in a local component database of the local system that is accessible via the at least one local federated database. Non-locally-restricted-access data is provided in a centralized database in block 102. A request for data which has been initiated by a user within an instance of a software application is received in block 104. In block 106 authorization of the user is checked to determine the user has been authorized to access locally-restricted-access data.

In embodiments comprising a two-tier architecture, the authorization check of block 106 may already be performed at the instance of the software application. In embodiments comprising a three-tier architecture, the authorization check of block 106 may be performed at an application server assignment manager as the routing instance. If it is determined in block 106 that the user has not been explicitly authorized to access locally restricted-access data, flow proceeds from block 106 via block 108 to block 116, in which the request is assigned to for example a global application server. The global application server is dedicated to the centralized database. After that the request is provided from the global application server to the centralized database in block 118. The request is processed at the centralized database in block 120, with a processing being restricted to data stored in the centralized database.

If it is determined in block 106 that the user has been authorized to access locally restricted-access data, flow proceeds from block 106 via block 110 to block 124. If the local instance of the software application has been authorized to access locally restricted-access data, the request is assigned to at least one local system having dedicated a local application server in block 124. The local application server is dedicated to a respective local federated database. Thus, the request is routed to the local federated database in block 126. Then the request is processed at the local federated database in block 128, where the processing been performed using data stored persistently in at least one local system and a centralized database. In block 130 a federated view of process data is provided by the local federated database.

Figure 2:
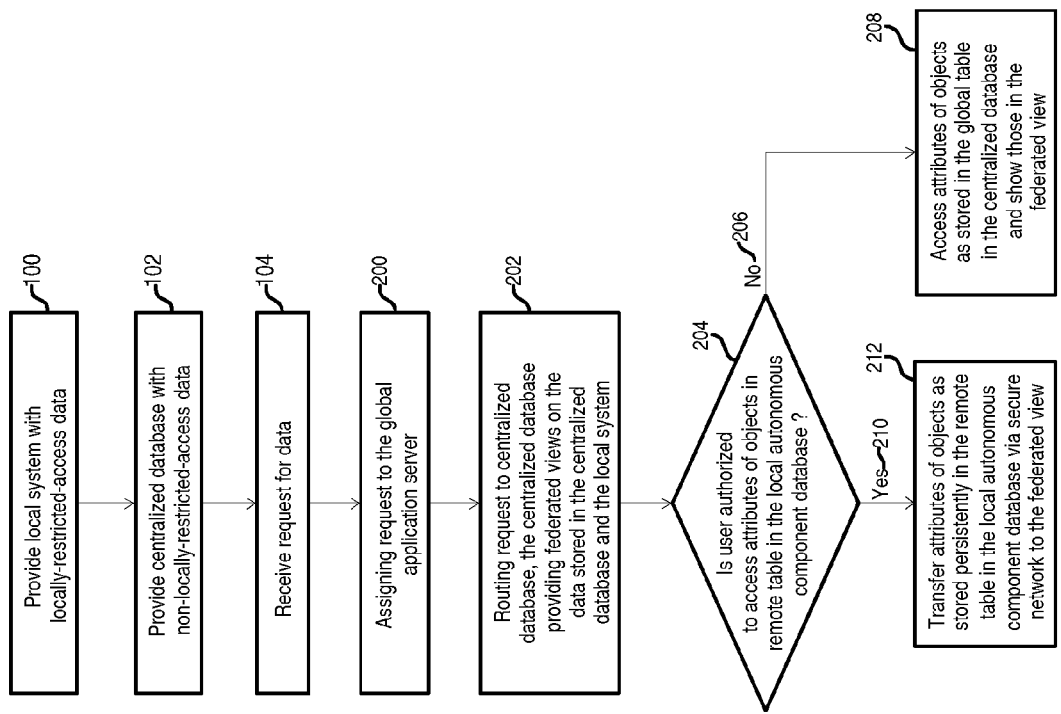
FIG. 2 is a flowchart of a method for processing restricted-access data of distributed data with a centralized database acting as a federated database generating federated views.

FIG. 2 is a flowchart illustrating an embodiment of a method for fulfilling a request for data in the case the centralized database acts as a federated database providing federated views on data stored in a centralized database and in at least one local system. The method of FIG. 2 may be applied to local systems that store access-restricted data that may be accessed via secure network connections. For example, encrypted channels using end-to-end encryption may be used (e.g. using https). Additionally or alternatively, the data may be encrypted using symmetric or asymmetric cryptography. In FIG. 2, blocks 100 to 104 refer to blocks 100 to 104 of FIG. 1, in which a local system is provided comprising a storage for locally-restricted-access data, the centralized database is provided comprising the non-locally-restricted-access data, and a request for data is received, which for example has been initiated by a user in a local instance of the software application. In the method of FIG. 2, flow proceeds from block 104 to block 200 of FIG. 2. Because there is a secure network between the centralized database and the at least one local autonomous database component in the method of FIG. 2, the request is assigned to at least one global application server in block 200. The system infrastructure in which the method of FIG. 2 is applied may comprise a three-tier architecture, wherein the global application server is dedicated to the centralized database.

In accordance with a preconfigured relationship between the user, who has initiated the data request within the instance of the software application, the data request is routed in block 202 to the centralized database. The centralized database acts as a federated database providing federated views on the data stored persistently in the at least one local system and in the centralized database. For filling the columns in the federated database with attributes of objects, in block 204, a check may be made, if the user who has initiated the data request, is authorized to access attributes of objects which are stored persistently in at least one remote table in the respective local system. A check whether the user is authorized to see locally-restricted by checking the user's authorization via an administrative table that contains authorization assignments. The check may be performed based on a current location of the user. In various embodiments, the current location may be a fixed assignment of for example a user ID with a given location, or in the current spatial location of the user may be comprised in the request. In both cases, the authorization check is made at the centralized database.

If it is determined in block 204 that the user is not authorized to access attributes of objects persistently stored in remote tables in at least one local system, these attributes will remain invisible for the user, and flow proceeds from block 204 via block 206 to block 208. Thus, in block 208 only attributes of the corresponding objects are retrieved from the global table in the centralized database, acting as the federated database. If it is determined in block 204 that the user is explicitly authorized to access these attributes of the objects in the at least one local system, flow proceeds from block 204 to block 212 via block 210, and the attributes these are retrieved from the federated view in block 212 by transferring those attributes via a secure network for providing the federated view at the centralized database.

Figure 3:
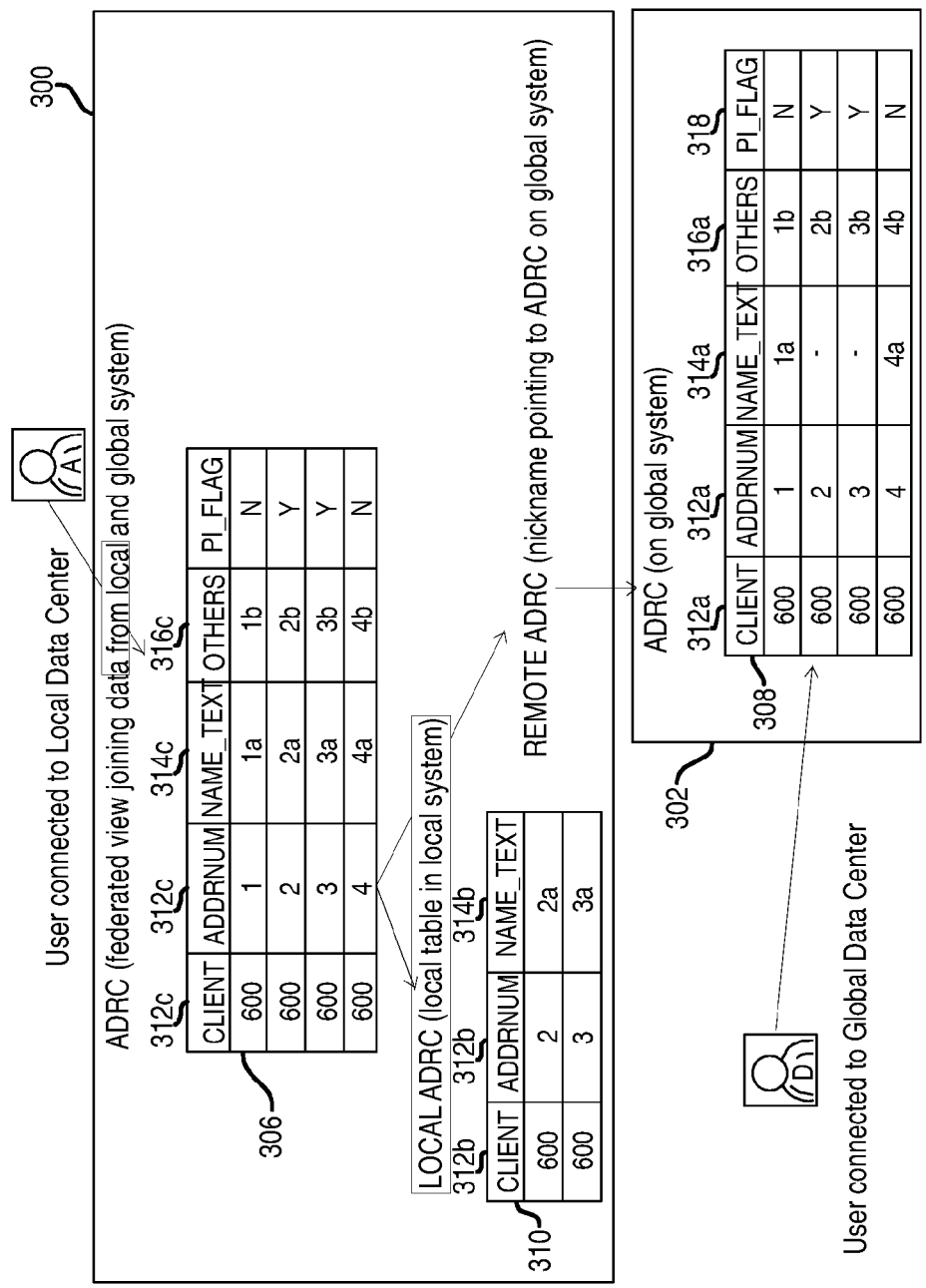
FIG. 3 is a block diagram illustrating the generation of a federated view in a local system.

FIG. 3 is a block diagram illustrating an embodiment of a federated view 306 in a local federated database 300. The view of FIG. 3 may be generated by retrieving locally-restricted-access data from a local table 310 of a local federated database 300. Primary keys 312a (CLIENT and ADDRNUM) of a global table 308 (ADRC) of a centralized database 302 are matched with primary keys 312b (CLIENT and ADDRUM) of local table 310 (LOCAL.ADRC). The primary keys 312a and 312b, after a generation of a set union, are the base for the primary keys 312c in the federated view 306 (ADRC) in the federated database 300. The primary keys 312a and 312b as well as 312c correspond to objects, to which attributes 314a and 316a respectively, 314b as well as 314c and 316c are assigned in the global table 308, respectively in the local table 310 as well as in the federated view 306.

In the example of FIG. 3, the attributes 316a OTHERS are accessible to all local systems of the global software application. For attributes 314, in contrast, an indicator 318, in this case PI_FLAG, is used to determine which values have to be retrieved from the local table 310 and which values have to be retrieved from the global table 308. In the federated view 306 ADRC the respective attribute 314a NAME_TEXT will only be visible as attribute 314b NAME_TEXT, in case the indicator 318 PI_FLAG has been set on Y. Otherwise the respective attribute 314c NAME_TEXT of the federated view 306 will be retrieved from the global table 308 ADRC from the column containing the attributes 314a NAME_TEXT of the respective object 312a. The column 316c OTHERS of the federated view 306 in the federated database 300 is identical with the column 316a OTHERS in the global table 308 ADRC in the centralized database 302, because the column 316a containing the attributes OTHERS of the respective object 312a has been defined, in this case, as free for access to the local system of the global software application.

The following instructions may be used in some embodiments to set up a federated database to support locally restricted-access data, with database 2 (DB2) being a commercial relational database management system (DBMS) of the International Business Machines (IBM) corporation. The description below assumes a new database system instance has been created and that there is a script that creates a nickname on the DB2 system for each end user table on the remote database system, which may be DB2 for z/Operating System (z/OS). Federation is enabled by setting the DBMS configuration parameter FEDERATED to YES. A new database is created and connection is made to the new database. The distributed relational database architecture (DRDA) wrapper is registered to enable access to remote DB2 systems, and the remote DB2 for z/OS system is registered as server. A user mapping is registered to map the DB2 connection user for the local database system to the DB2 connection user for the remote database system. A user mapping is an association between a federation server authorization identifier (ID) and a data source user ID and password. By default, user mappings are stored in the catalog on the federated server, but they may be stored in an external repository, such as on a lightweight directory access protocol (LDAP) server in some embodiments. Data source statistics may be updated at the remote system (via DB2 command RUNSTATS) for a good performance of federated queries.

At nickname creation time, the remote statistics are shipped to the local system and exploited by the query optimizer. The local statistics may be updated by using the SYSPROC.NNSTAT stored procedure. Registration of nicknames may be done by a script that accesses the DB for z/OS system catalog and for each user table this script has to create an equally named nickname on the DB2 for LUW system, e.g., CREATE NICKNAME <SCHEMA>.KNA1 FOR OS390<SCHEMA>DEPARTMENT, where OS390 is the name of the server pointing to the remote DB2/z database. For each table that contains process industry (PI) data the following may be performed: dropping the nickname that has been created in the previous block (it has to be replaced by a federated view); creating a nickname for the remote table in schema "REMOTE"; creating a corresponding local table consisting of all key columns and all PI columns; using the same table name, but use "LOCAL" as schema name; and creating a federated view in the original schema that joins the data. For all rows that do not contain production planning (PP)-PI data the row is taken from the remote table. For all rows that contain PP-PI data the remote data is joined with the local data and all the local columns are used in the result set instead of the remote ones (that have some default value, e.g. "blank").

In an example, a table named ADRC has 5 columns, with CLIENT and ADDRNUMBER as primary key and 3 additional columns, NAME_TEXT, OTHERS and PI_FLAG. The column NAME_TEXT needs to be protected, and PI_FLAG is set to 'Y' for those addresses that have to be protected and to 'N' otherwise. The following structured query language (SQL) statements would be needed in this case: DROP NICKNAME <SCHEMA>.ADRC. CREATE NICKNAME REMOTE.ADRC FOR OS390.<SCHEMA>.DEPARTMENT. CREATE TABLE LOCAL.ADRC (CLIENT VARCHAR(9), ADDRNUMBER VARCHAR(30), NAME_TEXT VARCHAR(50)). CREATE VIEW<SCHEMA>.ADRC as (SELECT*FROM REMOTE.ADRC WHERE PI_FLAG='N') UNION ALL (SELECT L.CLIENT, L.ADDRNUMBER, L.NAME_TEXT, R.OTHERS, R.PI_FLAG FROM REMOTE.ADRC R, LOCAL.ADRC L where R.CLIENT=L.CLIENT and R.ADDRNUMBER=L.ADDRNUMBER and R.PI_FLAG='Y'). In some embodiments, the business application running on the databases may have application specific configuration/catalog tables that for performance and/or functional reasons should be kept locally in both database systems and not be replaced by a nickname.

Figure 4:
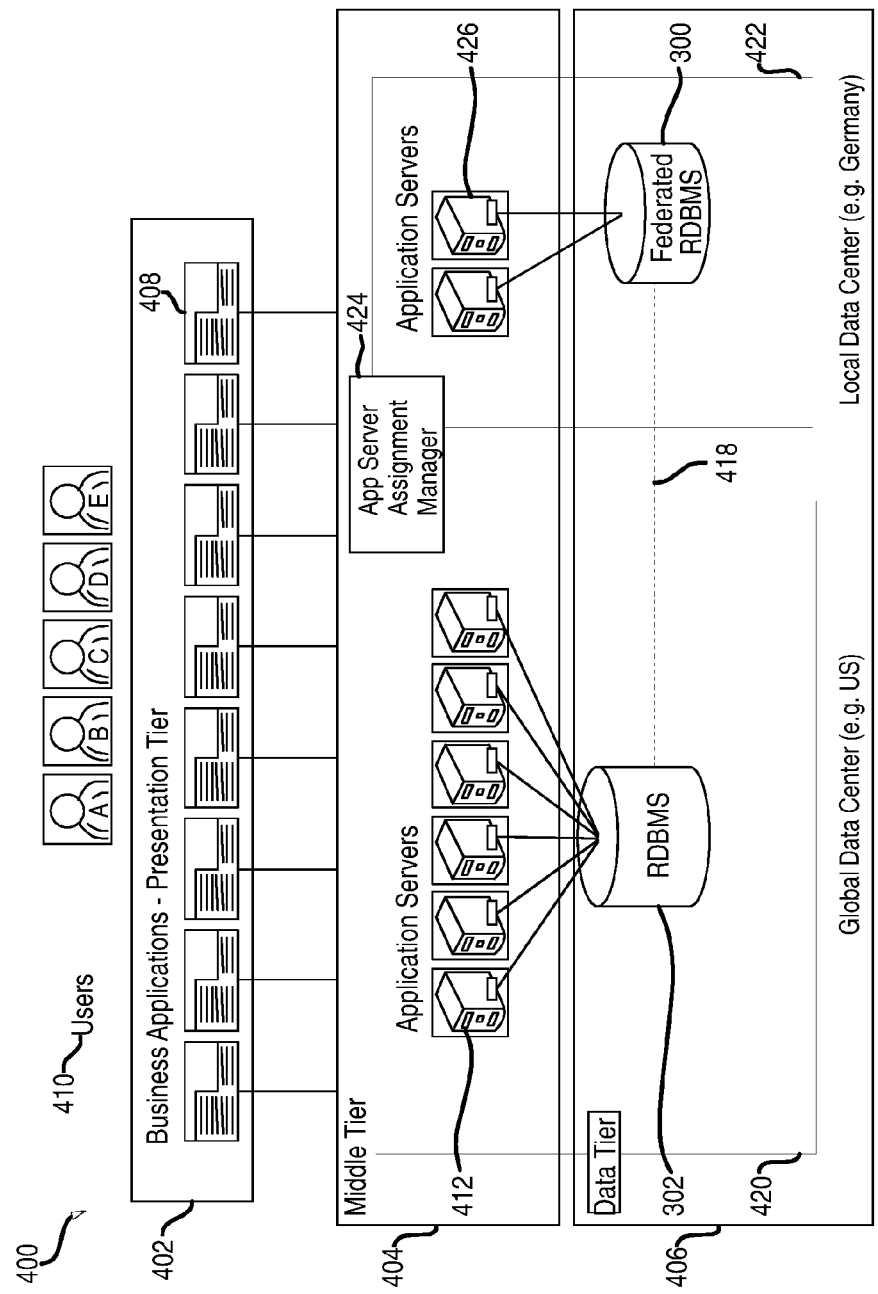
FIG. 4 is a block diagram showing a three-tier architecture of a system infrastructure.

FIG. 4 is a block diagram showing the system infrastructure in the form of a three-tier architecture. The three-tier architecture 400 comprises a presentation tier 402, a middle tier 404 and a data tier 406. The presentation tier 402 comprises business applications such as software application 408. In the presentation tier 402, users 410 are able to initiate certain requests for data. As a response to their data requests the users 410 are also able to see the results of their data requests in the software application 408 in the presentation tier 402. The presentation tier 402 is connected with the middle tier 404. The application servers 412 of the middle tier 404 are parts of a global data center 420, therefore named in the following as global application servers. The application servers 426 are part of a local data center 422, therefore in the following those application servers 426 of the middle tier 404 are named as local application servers 426.

The global application servers 412 are connected and designated to a centralized database 302 of the data tier 406. The centralized database 302 is also part of the global data center 420. The location application servers 426 of the middle tier 404 are connected and designated to a local federated database 300. The federated database 300 is part of the respective local data center (i.e. local system) 422. The centralized database 302 and the respective local federated database 300 are connected by a connection 418. The local federated database 300 is able to generate federated views with data stored persistently in the local system, and data stored in the centralized database 302. For example, the centralized database 302 is used for persistently storing non-restricted access data of distributed data and the local system 422 may comprise at least one federated database 300 and optionally at least one local component database (not shown here) for persistently storing restricted-access data of the distributed data.

An application server assignment manager 424 in the middle tier 404 is able to route a data request of the user to the local or the global application server(s). The routing of the data request to the at least one local application server 426 is performed in accordance with a preconfigured relationship between the user and the at least one local application server 426. The preconfigured location based relationship between the user 410 and the respective application server comprises a predefined configuration of a certain processing of a data request. The relationship is thus depending on the location of the user and the respective area to which the application server 426 is assigned. In case of a matching, the routing is performed to the application server 426. In case of a mismatching, the application server assignment manager routes the request to the application server(s) 412.

By including a concept of user groups, it may be defined at the application level within a certain administration tool to determine in advance which data request of a user group will be routed to which of the global application servers 412 or to which of the local application servers 426. It may be defined at application level which local users or user groups are allowed to access a special local application server 426. This may be done in a country-specific manner in some embodiments by setting of the appropriate indicators. In another embodiment the application server assignment manager 424 can be the System Analysis and Program Development (SAP) Load Balancer™ tool.

In the embodiment shown in FIG. 4, in the centralized database 302 only data is stored which is not privacy protected. Users which are not allowed to privacy protected information have only access to this data stored in the centralized database via corresponding routing by the global application servers 412. Those users will only see default values when trying to access privacy protected information. Requests of local users, who are allowed to access privacy protected information stored on a local system, will routed to one of the local application servers 426 which has been directed to use the local federated database 300 providing a federated view containing also privacy protected information. When requesting data, those local users who are authorized to see privacy protected information may see the same screen as those users who are not allowed to do so, with the addition of the privacy protected information data coming from the local system as well as non-privacy protected information coming from the centralized database 302.

To enable combined and integrated processing of data in accordance with the individual authorization of the user to access privacy protected information, the federation capabilities of the local database management systems may be exploited. The federation of data is to correlate data from local tables and remote data sources, as if all the data is stored locally in the federated database. The federated database 300 may include nicknames pointing to the global table 308 as well as federated views 306 that join remote information data with local privacy protected information. By means of the nicknames, the remote information data can be retrieved.

The architecture shown in FIG. 4 can be used for several privacy protected information processing database schemes with locally distributed databases. In this case each location needs its own local application server(s) 426. All privacy protected information data is stored in a local database. The database management system (DBMS) has to be a federated DBMS supporting federated views with a DBMS that hosts the centralized database. Privacy protected information data is not stored in the centralized database and will not leave the local system environment. Only data that is not privacy protected information is stored in the centralized database.

Embodiments of processing of restricted access data as discussed above with respect to FIGS. 1-4 may be implemented together with any appropriate type of computer, having any appropriate platform for storing and/or executing program code. A computing system may include one or more processor(s) with one or more cores per processor, associated memory elements, an internal storage device (e.g., a hard disk, an optical drive such as a compact disk drive or digital video disk (DVD) drive, a flash memory stick, etc.), and numerous other elements and functionalities, typical of today's computers (not shown). The memory elements may include a main memory, e.g., a random access memory (RAM), employed during actual execution of the program code, and a cache memory, which provides temporary storage of at least some program code and/or data in order to reduce the number of times, code and/or data must be retrieved from a long-term storage medium or external bulk storage for an execution. Elements inside the computer may be linked together by means of a bus system with corresponding adapters.

The computing system may also include input means, such as a keyboard, a pointing device such as a mouse, or a microphone (not shown). Alternatively, the computing system may be equipped with a touch sensitive screen as main input device. Furthermore, the computer, may include output means, such as a monitor or screen [e.g., a liquid crystal display (LCD), a plasma display, a light emitting diode display (LED), or cathode ray tube (CRT) monitor]. The computer system may be connected to a network (e.g., a local area network (LAN), a wide area network (WAN), such as the Internet or any other similar type of network, including wireless networks via a network interface connection. This may allow a coupling to other computer systems or a storage network or a tape drive. Those, skilled in the art will appreciate that many different types of computer systems exist, and the aforementioned input and output means may take other forms. Generally speaking, the computer system may include any appropriate processing, input and/or output means.

Further, one or more elements of the aforementioned computer system may be located at a remote location and connected to the other elements over a network. Further, some embodiments may be implemented on a distributed system having a plurality of nodes, where various functions may be located on a different node within the distributed system. In one embodiment, a node corresponds to a computer system. Alternatively, the node may correspond to a processor with associated physical memory. The node may alternatively correspond to a processor with shared memory and/or resources or a smartphone.

Further, software instructions to perform embodiments of processing of restricted access data may be stored on a computer storage readable medium, such as a compact disk (CD), a diskette, a tape, or any other computer readable storage device.

It should also be noted that the term "comprising" does not exclude other elements or blocks and "a" or "an" does not exclude a plurality. On the other side, the term "comprising" may also include the case of "consisting of". Also, elements described in association with different embodiments may be combined. It should also be noted that reference signs in the claims should not be construed as limiting elements.

The technical effects and benefits of exemplary embodiments include automatic installation and configuration of a software appliance across a variety of computing systems.

The terminology used herein is for the purpose of describing particular embodiments only and is not intended to be limiting of the claims. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, blocks, operations, elements, and/or components, but do not preclude the presence or addition of one or more other features, integers, blocks, operations, elements, components, and/or groups thereof The corresponding structures, materials, acts, and equivalents of all means or block plus function elements in the claims below are intended to include any structure, material, or act for performing the function in combination with other claimed elements as specifically claimed. The description has been presented for purposes of illustration and description, but is not intended to be exhaustive or limited in the form disclosed. Many modifications and variations will be apparent to those of ordinary skill in the art without departing from the scope and spirit of the disclosure. The embodiment was chosen and described in order to best explain the principles and the practical application, and to enable others of ordinary skill in the art to understand the disclosure for various embodiments with various modifications as are suited to the particular use contemplated.

The invention claimed is:

1. A computer-implemented method for processing of restricted-access data, comprising:
   receiving a request for data from a user of an instance of a software application by a storage system infrastructure comprising a centralized database that stores only non-restricted access data and a local system that stores restricted-access data, the local system being associated with a respective first set of areas or entities and comprising a federated database for providing a federated view of the non-restricted access data and the restricted access data, wherein the requested data comprises restricted-access first data from the local system and non-restricted access second data from the centralized database;
   determining whether a geographical location of the user matches a geographical area to which the local system is assigned;
   based on the geographical location of the user matching the geographical area to which the local system is assigned:
      routing, by a routing entity, the request to the local system, wherein the routing entity does not route the request to the centralized database;
      receiving the request at the federated database of the local system based on the routing;
      retrieving from the federated database the restricted-access first data from the local system and the non-restricted access second data from the centralized database; and
      displaying the federated view comprising the restricted-access first data and the non-restricted access second data to the user via the software application; and
   based on the geographical location of the user not matching the geographical area to which the local system is assigned:
      routing, by the routing entity, the request to the centralized database, wherein the routing entity does not route the request to the local system;
      retrieving from the centralized database the non-restricted access second data; and
      displaying the non-restricted access second data to the user via the software application, wherein the restricted access first data is not retrieved or displayed to the user.

2. The method of claim 1, wherein the restricted-access first data comprises first objects with first attributes, and the non-restricted access second data comprises second objects with second attributes, wherein the first objects correspond to first primary keys of first tables stored persistently in the centralized database and the second objects correspond to second primary keys of second tables stored persistently in the local system.

3. The method of claim 2, wherein the first tables comprise a first column with the first primary keys and first successive columns with the first attributes associated with the first objects, wherein the second tables comprise a second column with the second primary keys and second successive columns with the second attributes associated with the second objects, wherein the first attributes are marked by indicators, the indicators indicating if the first attributes are accessible to the user, and wherein the displaying of the federated view comprises:
   generating a third column of third primary keys and third successive columns with third attributes associated with the third primary keys in third tables in the federated database;
   determining for a given first attribute of the first attributes if the indicator of said given first attribute indicates that this given first attribute is accessible to the local system,
   based on the given first attribute being accessible to the local system, generating the third primary keys by performing a union process of the first primary keys and the second primary keys and generating the third attributes by a union process of the first and second attributes.

4. The method of claim 1, wherein the federated database and the centralized database each comprise at least one of relational and object-oriented databases.

5. The method of claim 1, wherein the storage system infrastructure comprises a three-tier architecture, the three-tier architecture comprising:
   a presentation tier, the instance of the software application being located in the presentation tier, wherein the presentation tier is adapted to visualize the federated view;
   a middle tier, the middle tier comprising at least one local application server dedicated to the local system, at least one global application server dedicated to the centralized database and an application server assignment manager, wherein the application server assignment manager is the routing entity; and
   a data tier, the data tier comprising the centralized database and the federated database;
   wherein the application server assignment manager is configured to:
      route the request to the at least one local application server based on the geographical location of the user matching the geographical area to which the local system is assigned, wherein the at least one local application server routes the request to the federated database; and
      route the request to the global application server based on the geographical location of the user not matching the geographical area to which the local system is assigned, wherein the global application server routes the request to the centralized database.

6. The method of claim 5, wherein the data tier further comprises a connection between the centralized database and the federated database, and wherein the federated database is configured to retrieve the non-restricted access second data from the centralized database through the connection and provide the non-restricted access second data to the local application server.

7. The method of claim 5, wherein the global application server and the centralized database are located outside of the geographical area, and the local application server and the federated database are located inside of the geographical area.

8. The method of claim 1, wherein the storage system infrastructure comprises a two-tier architecture, the two-tier architecture comprising:
    a presentation tier, the instance of the software application being located in the presentation tier, wherein the presentation tier is adapted to visualize the federated view, wherein the instance of the software application is the routing entity; and
    a data tier, the data tier comprising the centralized database and the federated database.

9. The method of claim 8, wherein the data tier further comprises a connection between the centralized database and the federated database, and wherein the federated database is configured to retrieve the non-restricted access second data from the centralized database through the connection and provide the non-restricted access second data to the instance of the software application.

10. The method of claim 1, wherein the centralized database is located outside of the geographical area, and the local system is located inside of the geographical area.

11. A system for processing of restricted-access data, comprising:
    a storage system infrastructure, the storage system infrastructure comprising a memory comprising a centralized database that stores only non-restricted access data and a local system that stores restricted-access data, the local system being associated with a respective first set of areas or entities and comprising a federated database for providing a federated view of the non-restricted access data and the restricted access data, the system comprising a processor configured to perform a method comprising:
    receiving a request for data from a user of an instance of a software application by the storage system infrastructure, wherein the requested data comprises restricted-access first data from the local system and non-restricted access second data from the centralized database;
    determining whether a geographical location of the user matches a geographical area to which the local system is assigned;
    based on the geographical location of the user matching the geographical area to which the local system is assigned:
        routing, by a routing entity, the request to the local system, wherein the routing entity does not route the request to the centralized database;
        receiving the request at the federated database of the local system based on the routing;
        retrieving from the federated database the restricted-access first data from the local system and the non-restricted access second data from the centralized database; and
        displaying the federated view comprising the restricted-access first data and the non-restricted access second data to the user via the software application; and
    based on the geographical location of the user not matching the geographical area to which the local system is assigned:
        routing, by the routing entity, the request to the centralized database, wherein the routing entity does not route the request to the local system;
        retrieving from the centralized database the non-restricted access second data; and
        displaying the non-restricted access second data to the user via the software application, wherein the restricted access first data is not retrieved or displayed to the user.

12. The system of claim 11, wherein the storage system infrastructure comprises a three-tier architecture, the three-tier architecture comprising:
    a presentation tier, the instance of the software application being located in the presentation tier, wherein the presentation tier is adapted to visualize the federated view,
    a middle tier, the middle tier comprising at least one local application server dedicated to the local system, at least one global application server dedicated to the centralized database and an application server assignment manager, wherein the application server assignment manager is the routing entity; and
    a data tier, the data tier comprising the centralized database and the federated database;
    wherein the application server assignment manager is configured to:
        route the request to the at least one local application server based on the geographical location of the user matching the geographical area to which the local system is assigned, wherein the at least one local application server routes the request to the federated database; and
        route the request to the global application server based on the geographical location of the user not matching the geographical area to which the local s stem is assigned wherein the global application server routes the request to the centralized database.

13. The system of claim 12, wherein the data tier further comprises a connection between the centralized database and the federated database, and wherein the federated database is configured to retrieve the non-restricted access second data from the centralized database through the connection and provide the non-restricted access second data to the local application server.

14. The system of claim 11, wherein the storage system infrastructure comprises a two-tier architecture, the two-tier architecture comprising:
    a presentation tier, the instance of the software application being located in the presentation tier, wherein the presentation tier is adapted to visualize the federated view, wherein the instance of the software application is the routing entity,
    a data tier, the data tier comprising the centralized database and the federated database.

15. The system of claim 11, wherein the centralized database is located outside of the geographical area, and the local system is located inside of the geographical area.

16. A computer program product for processing of restricted-access data, the computer program product comprising:
    a non-transitory computer readable storage medium having computer readable program code configured to:
        receive a request for data from a user of an instance of a software application by a storage system infrastructure comprising a centralized database that stores only non-restricted access data and a local system that stores restricted-access data, the local system being associated with a respective first set of areas or entities and comprising a federated database for providing a federated view of the non-restricted access data and the restricted access data, wherein the requested data comprises restricted-access first data from the local system and non-restricted access second data from the centralized database;
determine whether a geographical location of the user matches a geographical area to which the local system is assigned;
based on the geographical location of the user matching the geographical area to which the local system is assigned:
  route, by a routing entity, the request to the local system, wherein the routing entity does not route the request to the centralized database;
  receive the request at the federated database of the local system based on the routing;
  retrieve from the federated database the restricted-access first data from the local system and the non-restricted access second data from the centralized database; and
  display the federated view comprising the restricted-access first data and the non-restricted access second data to the user via the software application; and
based on the geographical location of the user not matching the geographical area to which the local system is assigned:
  route, by the routing entity, the request to the centralized database, wherein the routing entity does not route the request to the local system;
  retrieve from the centralized database the non-restricted access second data; and
  display the non-restricted access second data to the user via the software application, wherein the restricted access first data is not retrieved or displayed to the user.

17. The computer program product of claim 16, wherein the restricted-access first data comprises first objects with first attributes, and the non-restricted access second data comprises second objects with second attributes, wherein the first objects correspond to first primary keys of first tables stored persistently in the centralized database and the second objects correspond to second primary keys of second tables stored persistently in the local system.

18. The computer program product of claim 17, wherein the first tables comprise a first column with the first primary keys and first successive columns with the first attributes associated with the first objects, wherein the second tables comprise a second column with the second primary keys and second successive columns with the second attributes associated with the second objects, wherein the first attributes are marked by indicators, the indicators indicating if the first attributes are accessible to the user, and wherein the displaying of the federated view comprises:
  generating a third column of third primary keys and third successive columns with third attributes associated with the third primary keys in third tables in the federated database;
  determining for a given first attribute of the first attributes if the indicator of said given first attribute indicates that this given first attribute is accessible to the local system,
  based on the given first attribute being accessible to the local system, generating the third primary keys by performing a union process of the first primary keys and the second primary keys and generating the third attributes by a union process of the first and second attributes.

19. The computer program product of claim 16, wherein federated database and the centralized database each comprise at least one of relational and object-oriented databases.

20. The computer program product of claim 16, wherein the user is associated with the first set of areas or entities by an authorization scheme that determines a match between an authorization of the user and the first set of areas or entities, and wherein the routing of the request is performed to the local system based on the authorization scheme.

* * * * *